United States Patent
Savic et al.

(10) Patent No.: US 11,315,013 B2
(45) Date of Patent: Apr. 26, 2022

(54) IMPLEMENTING PARAMETER SERVER IN NETWORKING INFRASTRUCTURE FOR HIGH-PERFORMANCE COMPUTING

(71) Applicant: EMC IP Holding Company LLC, Hopkinton, MA (US)

(72) Inventors: Dragan Savic, Brookline, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 933 days.

(21) Appl. No.: 15/960,472

(22) Filed: Apr. 23, 2018

(65) Prior Publication Data

US 2019/0325302 A1     Oct. 24, 2019

(51) Int. Cl.
*G06N 3/08*     (2006.01)
*G06F 9/455*    (2018.01)
*H04L 67/1095*  (2022.01)

(52) U.S. Cl.
CPC .......... *G06N 3/08* (2013.01); *G06F 9/45558* (2013.01); *H04L 67/1095* (2013.01); *G06F 2009/45595* (2013.01)

(58) Field of Classification Search
CPC ...... G06N 3/08; G06N 20/00; G06F 9/45558; G06F 2009/45595; H04L 67/1095
See application file for complete search history.

(56) References Cited

U.S. PATENT DOCUMENTS

| | | | |
|---|---|---|---|
| 6,895,506 B1* | 5/2005 | Abu-Husein | G06F 21/121 380/29 |
| 9,888,095 B2* | 2/2018 | Caulfield | H04L 69/165 |
| 10,289,973 B2* | 5/2019 | Feller | G06N 20/00 |
| 10,678,721 B1* | 6/2020 | BeSerra | G06F 11/2221 |
| 2009/0228684 A1* | 9/2009 | Ramesh | G06F 15/16 712/29 |
| 2015/0026385 A1* | 1/2015 | Egi | G06F 13/161 710/314 |
| 2019/0028185 A1* | 1/2019 | Tomasicchio | H04B 7/0486 |
| 2019/0042515 A1* | 2/2019 | Guim Bernat | G06F 9/45533 |

(Continued)

OTHER PUBLICATIONS

Chilimbi et al., "Project Adam: Building an Efficient and Scalable Deep Learning Training System", 11th USENIX Symposium on Operating Systems Design and Implementation, Oct. 6, 2014.*

(Continued)

*Primary Examiner* — Todd L Barker
(74) *Attorney, Agent, or Firm* — Ryan, Mason & Lewis, LLP

(57) ABSTRACT

Techniques are provided for implementing a parameter server within a networking infrastructure of a computing system to reduce the communication bandwidth and latency for performing communication synchronization operations of the parameter server. For example, a method includes executing a distributed deep learning (DL) model training process to train model parameters of a DL model using a plurality of worker nodes executing on one or more server nodes of a computing system, and executing a parameter server within a networking infrastructure of the computing system to aggregate local model parameters computed by the plurality of worker nodes and to distribute aggregated model parameters to the plurality of worker nodes using the networking infrastructure of the computing system.

20 Claims, 5 Drawing Sheets

(56) References Cited

U.S. PATENT DOCUMENTS

2019/0103972 A1* 4/2019 Pope .................. G06F 21/76
2019/0243694 A1* 8/2019 Lippert ............... G06F 9/544
2020/0257566 A1* 8/2020 Ganguli .............. G06F 1/20

OTHER PUBLICATIONS

Kochura et al., "Performance Analysis of Open Source Machine Learning Frameworks for Various Parameters in Single Threaded and Mullti-Threaded Modes", Advances in Intelligent Systems and Computing, vol. 689, pp. 243-256.*

Volz, "Virtualization—divide and multiply our servers", Nov. 2002, ZDNet.*

Le at al., "UNO: Unifying Host and SmartNIC Offload for flexible packet processing", Sep. 24, 2017.*

Miller et al., "Talk to My Neightbors TransportL Decentralized Data Transfer and Scheduling Among Accelerators", Apr. 1, 2018.*

Li et al., "Scaling Distributed Machine Learning wiith the Parameter Server", Oct. 6, 2014.*

Silberstein et al. "Omni X: An accelerator—centric OS for omni-programmable systems" 2017.*

Firestone et al., "Azure Accelerated Networking SmartNIICs in the Public Cloud", 15th USENIX Symposium on Networked Sysems Design and Implementation (NSDI 2018), Apr. 9, 2018.*

M. Li et al., "Communication Efficient Distributed Machine Learning with the Parameter Server," Proceedings of the 27th International Conference on Neural Information Processing Systems (NIPS), Dec. 8-13, 2014, pp. 19-27, vol. 1.

H. Zhang et al., "Poseidon: An Efficient Communication Architecture for Distributed Deep Learning on GPU Clusters," Proceedings of the USENIX Annual Technical Conference (ATC), Jul. 12-14, 2017, pp. 181-193.

Iovisor, "Introduction to XDP," https://www.iovisor.org/technology/xdp, 4 pages.

* cited by examiner

200

US 11,315,013 B2

IMPLEMENTING PARAMETER SERVER IN NETWORKING INFRASTRUCTURE FOR HIGH-PERFORMANCE COMPUTING

FIELD

This disclosure relates generally to techniques for accelerated data processing in a high-performance computing environment.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPIUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and DL model training applications. A distributed DL model training task requires the collection, storage, and processing of a significantly large amount of data, wherein the data includes training data to build and optimize DL models, as well as model parameters of the deep learning models which are utilized for inference processing. Implementing an efficient distributed computing environment for DL training (and other HPC applications) is not trivial as the intensive computational workloads, and the massive volume of data that must be stored, streamed, prefetched, and coordinated between the shared computing resources of the distributed computing platform presents a significant challenge and practical limit on system performance and scalability.

For distributed DL training applications, an HPC system can implement a parameter server (PS) system to enable distributed and parallelized training of a deep neural network model using a cluster of worker nodes (e.g., accelerator devices such as GPU devices). A parameter server system provides a communication synchronization protocol in which multiple worker nodes involved in a parallel distributed DL training process have shared access to a recent set of model parameters of a given DL model being trained. The parameter server system provides a synchronization mechanism which involves performing an "all-reduce" operation by aggregating and averaging the processing results (subsets of computed parameters) from all parallel worker nodes, and then distributing the aggregated/averaged processing results to all worker nodes for subsequent computations. Depending on various factors such as, e.g., the amount of data that needs to be synchronized between the worker nodes, the number of worker nodes involved in the training process, the internode/intra-node network and hardware topology of the distributed systems, etc., the communication synchronization operations of the parameter server system can consume a significant amount of bus/network communication bandwidth, which can adversely impact the performance of the distributed DL training process.

SUMMARY

Illustrative embodiments of the invention include methods for implementing a parameter server within a networking infrastructure of a computing system to reduce the communication bandwidth and latency for performing communication synchronization operations of the parameter server. For example, one embodiment includes a method which comprises executing a distributed DL model training process to train model parameters of a DL) model using a plurality of worker nodes executing on one or more server nodes of a computing system, and executing a parameter server within a networking infrastructure of the computing system to aggregate local model parameters computed by the plurality of worker nodes and to distribute aggregated model parameters to the plurality of worker nodes using the networking infrastructure of the computing system.

Other embodiments of the invention include, without limitation, systems and articles of manufacture comprising processor-readable storage media, which are configured to implement a parameter server within a networking infrastructure of a computing system to reduce the communication bandwidth and latency for performing communication synchronization operations of the parameter server.

DETAILED DESCRIPTION

Figure 1:
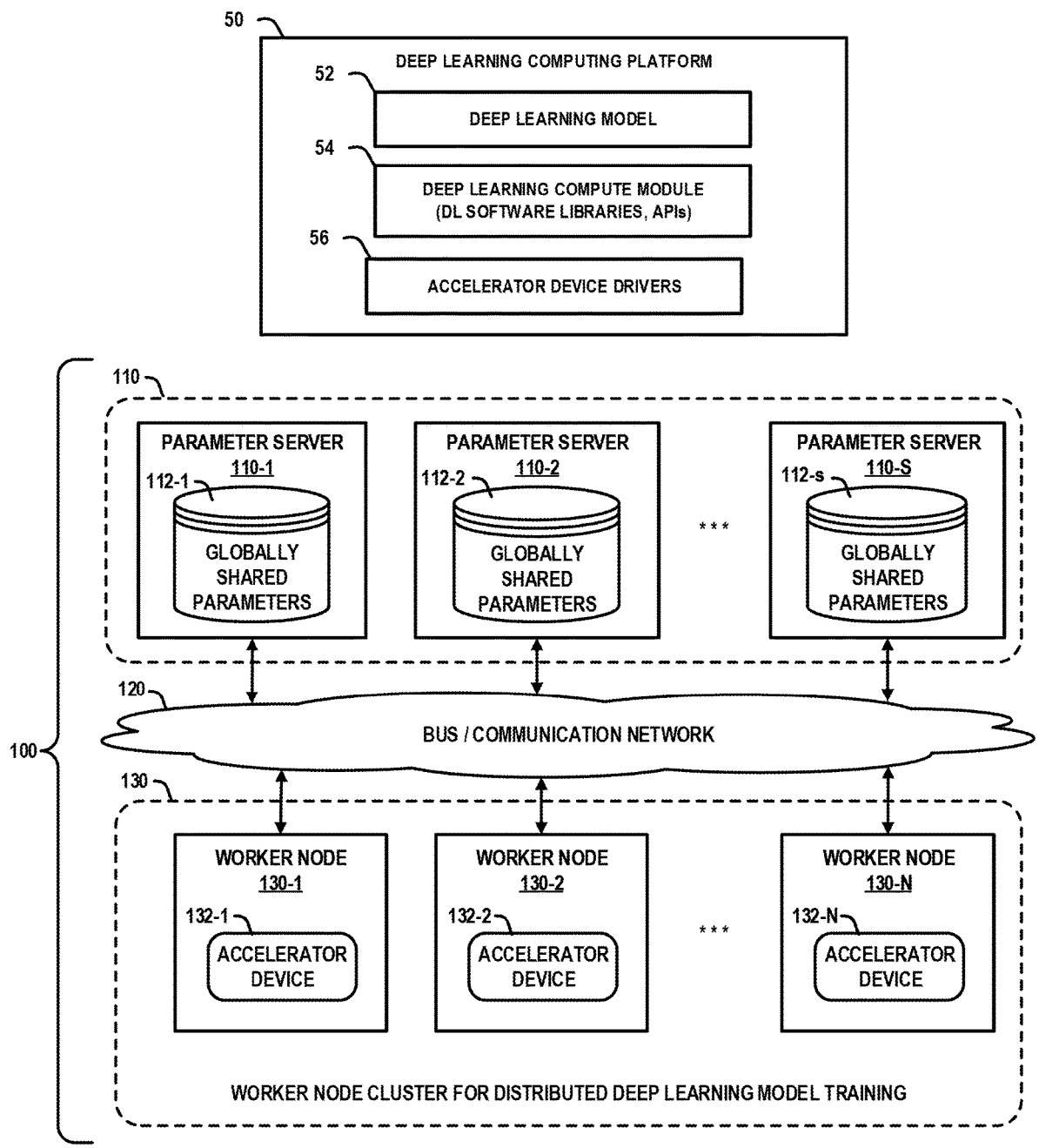
FIG. 1 schematically illustrates a computing system which is configured to perform distributed DL model training using a distributed parameter server system to synchronize and exchange model parameters between a cluster of worker nodes.

Illustrative embodiments of the invention will now be explained in further detail with regard to systems and methods for implementing a parameter server system within networking infrastructure elements such as network interface cards (NICs), virtual NICs, computational switch devices, and/or virtual switches, to support high-performance computing applications such as deep learning computing. While the exemplary embodiments discussed herein can be implemented for various HPC applications in which parameter server systems are utilized to synchronize application state, for illustrative purposes, embodiments of the invention will be discussed in the context of performing DL model training for Deep Neural Network (DNN) applications in a distributed computing environment. A distributed DL model training process requires a significant use of computing resources (e.g., processor, memory, storage, and networking resources), and the communication of large amounts of data over internal system busses and/or inter-node network communication links. As explained in further detail below, the incorporation of parameter server logic within networking infrastructure elements enhances communication performance (e.g. reduces communication latency) for performing parameter synchronization operations for a cluster of accelerator devices (e.g., GPU devices) performing a distributed, data parallel DL model training task.

A DL model is typically utilized in machine learning applications for pattern recognition, image processing, and other artificial intelligence applications. A DL application can utilize a DNN, wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc. A convolutional layer applies a "convolution operation" to an input dataset, and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a DL model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

A DL model can be trained using a stochastic gradient descent (SGD) training process. With SGD training, error gradient with respect to model parameters of a given DL model are calculated using multiple iterations of a backpropagation process. A backpropagation comprises a sequence of three cycles including (i) a forward process, (ii) a backward process, and (iii) a weight update process, wherein the backpropagation process is repeated for many iterations until a convergence criterion is met. A distributed SGD DL training process can be implemented in an HPC system using a data-parallel programming model in which the SGD training process is executed in parallel by a plurality of worker nodes (e.g., accelerator devices such as GPU devices) that are distributed over one or more compute nodes of the HPC system.

In data parallel training, for each iteration of a backpropagation process, a mini-batch of data samples is partitioned and evenly distributed to a plurality of worker nodes (e.g., GPU devices), which can reside on the same or different server machines. With data parallelism, each worker node has access to a complete copy of a current state of the DL model, but for each iteration, each worker node is only assigned a subset of the data samples of a current mini-batch for processing. For each iteration, each worker node executes kernel functions (via GPU devices) to perform a forward propagation of the DL network model using its respective subset of data samples, followed by an error backpropagation process to compute the gradient of the loss with respect to the DL model parameters. The worker nodes perform the forward and backward propagation operations on their respective subsets of a given mini-batch dataset in parallel. The gradient parameters computed by all worker nodes for the given iteration are then aggregated/synchronized (e.g. averaged) and the averaged gradient parameters are pushed to each worker node so that each worker node can perform a parameter update process using the averaged gradient parameters to update the model parameters of the DL network model.

Various distributed system configurations can be implemented to aggregate/synchronize the model parameters, and push the averaged gradient parameters to each worker node to perform the distributed DL model training process. In one embodiment, a DL model training process can be implemented using a parameter server system to perform distributed and parallelized SGD training of a DL model using a cluster of accelerator devices (e.g., GPU device). For example, FIG. 1 schematically illustrates an HPC system 10 which is configured to perform distributed DL model training using a distributed parameter server system to synchronize and exchange model parameters between a cluster of worker nodes. The HPC system 10 comprises a deep learning computing platform 50 which comprises a deep learning model layer 52, a deep learning compute module 54, and an accelerator device driver layer 56. The HPC system 10 further comprises a distributed computing system 100 which is configured to execute the various functions (e.g., distributed DL model training) of the deep learning computing platform 50.

The distributed computing system 100 comprises a parameter server system 110 comprising a plurality (S) of parameter server nodes 110-1, 110-2, . . . , 110-S (collectively, parameter servers 110), a bus/communication network 120, and a worker node cluster 130 comprising a plurality (N) of worker nodes 130-1, 130-2, . . . , 130-N (collectively, worker nodes 130). The parameter server nodes 110-1, 110-2, . . . , 110-S manage a respective set of globally shared model parameters 112-1, 112-2, . . . , 112-S. The worker nodes 130-1, 130-2, . . . , 130-N comprise respective accelerator devices 132-1, 132-2, . . . , 132-N (collectively, accelerator devices 132.). The accelerator devices 132 can be any type of processor (e.g., central processing unit (CPU), GPU, etc.) which is capable of performing high performance computing functions for the target application.

The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, multicore CPUs, GPUs, digital signal processors (DSPs), system-on-chip (SoC), application-specific integrated circuits (ASICs), and field programmable gate array (FPGAs), tensor processing units (TPUs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

Each worker node 130-1, 130-2, . . . , 130-N within the cluster 130 manages a worker process which is executed by a respective accelerator device 132-1, 132-2, . . . , 132-N. A worker process can be implemented as a bare metal process, or a virtual process (e.g., a virtual machine, container application, etc.). While the parameter server system 110 can be implemented on a single compute node to store and manage all parameters of a DL model in the single node, FIG. 1 illustrates an example embodiment of the distributed computing system 100 in which the parameter server logic of the parameter server system 110 is distributed over the plurality of parameter server nodes 110-1, 110-2, . . . , 110-S, which communicate to perform model parameter processing and synchronization functions as described in further detail below. In some embodiments, the logic of the parameter server nodes 110-1, 110-2, . . . , 110-S is executed by host processors (e.g. CPUs). In other embodiments, the logic of the parameter server node 110-1, 110-2, . . . , 110-S is executed by the same accelerator devices 132-1, 132-2, . . . , 132-N which execute the worker processes of the worker nodes 130-1, 130-2, . . . , 130-N.

In some embodiments, the parameter server nodes 110 and the worker nodes 130 of the distributed system 100 are separate logical nodes which execute on the same physical node (e.g., server node). In other embodiments, the parameter server nodes 110 and the worker nodes 130 of the distributed system 100 are separate logical nodes which are distributed and executed across two or more different physical nodes (e.g., different server nodes). In this regard, the bus/communication network 120 comprises backbone networking infrastructure and communication protocols to implement one or more of various types of intra-node and/or inter-node connection topologies and communication protocols that are utilized to physically connect, and enable communication between, the hardware processor resources which execute the functions of the parameter server nodes 110 and the worker nodes 130.

For example, the intra-node connection topologies within a given physical server node can be implemented using various communication protocols such as a Remote Direct Memory Access (RDMA) protocols, an InfiniBand (IB) protocol, a Peripheral Component Interconnect Express (PCIe) protocol, a NVIDIA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The inter-node connection topologies between different physical server nodes and the types of inter-node communication protocols that are used by the server nodes for network communication can include, but are not limited to, communication protocols such as TCP/IP, Gigabit Ethernet (GbE) (e.g., 10/25/40/100 GbE), RDMA, IB, Message Passing Interface (MPI), etc.

The deep learning computing platform 50 comprises a software platform to support deep learning tasks such as DL model training and inference processing (or classification), which are executed on the distributed computing system 100. The deep learning computing platform 50 can be implemented using known commercially available machine learning platforms such as Tensorflow, Microsoft Cognitive Toolkit (CNTK), Apache MXNet, Caffe, and other open-source deep learning frameworks that are configured to train, and deploy deep neural networks for HPC applications. The deep learning model layer 52 can implement one or more different types of models such as CNN models, recurrent neural network (RNN) models, region-based CNN (R-CNN) models, faster R-CNN models, mask R-CNN models, and other state-of-the-art DL models that are commonly utilized for high-performance DL computing applications.

The deep learning compute module 54 comprises software libraries and application programming interfaces (APIs) of one or more deep learning frameworks (e.g., Tensorflow NTIK, MXNet, etc.), which include pre-written code, classes, procedures, scripts, configuration data, etc., which (i) can be called or otherwise utilized by the accelerator devices 132-1, 132-2, . . . , 132-N (e.g., GPU devices) of the respective worker nodes 130-1, 130-2, . . . , 130-N executing machine learning tasks and related functions, or which (ii) are utilized by control functions executing on host processor devices to access or communicate with the accelerator devices 132-1, 132-2, . . . , 132-N through the accelerator device drivers 56. The types of software libraries and APIs of the deep learning compute module 54 will vary depending on the particular framework of the deep learning computing platform 50.

For example, the deep learning compute module 54 can implement commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In particular, the NVIDIA CUDA API comprises the CUDA® Deep Neural Network library (cuDNN) library and the NVIDIA cuBLAS library. As is known in the art, cuDNN is a GPU-accelerated library of primitives for deep neural networks, which provides implementations for standard routines such as forward and backward propagation operations in DL models comprising convolution layers, pooling layers, normalization layers, activation layers, etc. The cuDNN library is utilized by various deep learning frameworks, such as Tensorflow, CNTK, MXNet, Keras, and Caffe, to support high-performance GPU acceleration. The NVIDIA cuBLAS library is a fast GPU-accelerated implementation of the standard basic linear algebra subroutines (BLAS). The cuBLAS APIs allow an application to be accelerated by deploying compute-intensive operations to a single GPU or distributing work across multi-GPU configurations. Keras is a high-level neural network API, written in Python and capable of running on top of TensorFlow and CNTK. In one embodiment, the accelerator device driver layer 56 comprises GPU drivers that are implemented using cuDNN.

In some embodiments, the deep learning computing platform 50 implements methods to perform a distributed SGD training process to train DL models using a data-parallel training process executed on the distributed computing system 100. As noted above, with a SGD training process, error gradients are computed for the model parameters of a DL model being trained using multiple iterations of a backpropagation process which comprises a sequence of three cycles including (i) a forward process, (ii) a backward process, and (iii) a weight update process, wherein the backpropagation process is repeated for many iterations until a convergence criterion is met. Each iteration of the backpropagation process is performed on a mini-batch of data, wherein a mini-batch of data comprises a subset (or portion) of a total dataset of model training data.

With a data parallel SGD model training process, the host system (not shown in FIG. 1) will access mini-batches of a training dataset from persistent storage, and store the mini-batches of data in a host system memory. For a given iteration of an SGD DL training process, a given mini-batch of data (M data samples) is accessed from host system memory and evenly distributed among the plurality of worker nodes 130-1, 130-2, ..., 130-N, such that M/N data samples of the given mini-batch of data are transferred and copied to the memory of each accelerator device 132-1, 132-2, ..., 132-N. During the data parallel DL model training process, each worker node 130 has access to a complete, updated copy of the given DL model being trained, which is maintained in the data stores of globally shared model parameters 112-1, 112-2, ..., 112-S maintained by the respective parameter server nodes 110-1, 110-2, ..., 110-S. The globally shared parameters represent the model parameters (e.g., dense/sparse vectors, weights, etc.) that are computed by worker nodes 130 during a training phase, and aggregated/combined/synchronized by the parameter server nodes 110.

During the DL training process, the worker nodes 130-1, 130-2, ..., 130-N execute kernel functions on the respective accelerator devices 132-1, 132-2, ..., 132-N to perform the forward, backward, and a weight update cycles of the backpropagation process. For each iteration of the backpropagation process, each worker node 130-1, 130-2, ..., 130-N utilizes its local subset of mini-batch data to execute a forward propagation process on the DL model, followed by an error backpropagation process to compute gradients of the loss with respect to the DL network model parameters. In particular, the feed forward operation (forward process) is performed to process the subset of mini-batch data, layer by layer, using the given DL model. Once the information reaches the final output layer of the DL model, an error signal is calculated and back propagated through the layers of the DL model using a backward process, which involves minimizing an objective function by calculating error gradients with respect to model parameters (e.g., weights) and the input data. In this manner, for the given iteration, each worker node 130 computes a set of gradients of the DL model based on its local subset of the mini-batch of training data.

Following the forward and backward operation for the given iteration, each worker node 130 will communicate with one of the parameter server nodes 110 to send the locally computed parameters (gradients) to parameter server node 110. In some embodiments, there is one parameter server node 110 for each worker node 130. In other embodiments, each parameter server node 110 is assigned to two or more worker nodes 130. Each parameter server node 130 will receive a set of locally computed parameters from one or more associated worker nodes 130. The parameter server nodes 110-1, 110-2, ..., 110-S will then communicate with each other (via an inter-PS communication protocol) to aggregate the local parameters (e.g., compute global average gradients) and update the DL model parameters, and then push the updated DL model parameters to the worker nodes 130.

For example, in some embodiments, the parameter server nodes 110-1, 110-2, ..., 110-S send the local computed parameters (gradients) to one of the parameter server nodes 110 (all gather operation) which is designated to perform an all-reduce operation. The designated parameter server node 110 performs an all-reduce operation on the aggregated parameters by computing an average of all the local gradients provided by the worker nodes 130 for the given DL training iteration. The globally shared parameters 112-1, 112-2, ..., 112-s on each of the parameter server nodes 110 are then globally updated with the computed gradient average, and each parameter server node 110 pushes the global updated parameters to the worker nodes 130. The worker nodes 130 then proceed to use the global updated parameters to perform a weight update process for the given iteration of the DL model training process. In this manner, the model parameters are managed and synchronized by the plurality of cooperating parameter server nodes 110 that collectively update the globally shared model parameters 112-1, 112-2, ..., 112-s, which are shared across the worker nodes 130. With this framework, all state that is shared among the worker nodes 130 (i.e. the DL model parameters being learned) is maintained and synchronized by the parameter server nodes 110. At the end of each iteration, each worker node 130 has a complete copy of the most recent (intermediate) DL model.

In accordance with embodiments of the invention, techniques are provided to implement a distributed parameter server system (e.g., for distributed DL model training) in a way that provides high-communication performance for communication synchronization in terms of both bus/network bandwidth and minimal latency, thereby preventing the synchronization operations of the parameter server system from becoming a bottleneck for a data parallel, distributed DL model training process, as described above. Indeed, high communication bandwidth is needed to be able to sustain the transfer of local parameters from worker nodes to parameter server nodes, and the transfer of global updated parameters from the parameter server nodes to the workers during each iteration of the DL model training process to synchronize the application state. Further, the issue of communication latency is critically important for synchronized distributed DL training, as the training process is temporarily suspended/blocked during periods in which parameter synchronization operations are being performed.

On the other hand, the implementation of a parameter server system for distributed DL model training application has a relatively low impact on computing and storage resources. Indeed, with regard to computing resources, a parameter server system performs relatively simple computations, e.g., computing averages of floating point numbers. In addition, with regard to storage resources, a given DL model comprises a set of model parameters that require about 20 megabytes (MB) to about 500 MB, or greater. In addition, in distributed frameworks where the parameters of the DL model are sharded across N nodes, each parameter server will store 1/N of the total size of the DL model.

While some parameter server systems are configured to execute the parameter server logic in host system CPU devices or in accelerator devices (e.g., GPU devices) that perform the DL training operations, these configurations are not as optimal as incorporating parameter server logic into networking infrastructure elements using techniques as discussed herein. Indeed, while CPU devices have large storage capacity, the use of CPU devices to execute parameter server logic can result in relatively low communication and low computations. Further, while GPU devices have high power computing capabilities due to the massive number of cores and parallel computation model, state of the art GPU devices have less storage capabilities as compared to CPU system memory, and similar communication capabilities as CPUs.

In this regard, executing parameter server logic within networking infrastructure elements provides enhanced communication performance as compared to CPU and GPU devices. In this configuration, the parameter server logic is close to the raw networking hardware interface with much shorter code path, allowing the parameter synchronization to occur on "wire". In addition, dedicated networking optimized software, such as extended Berkeley Packet Filter (eBPF), eXpress Data Path (XDP), Storage Performance Development Kit (SPDK), etc., can be utilized to further reduce the latency in data traffic for sending and receiving model parameters by parameter server nodes executing in networking element to perform parameter synchronization operations. The ability to incorporate a parameter server system within a networking infrastructure of a distributed computing system is not trivial. There are various technical challenges for placing a parameter server system within the networking infrastructures, which are addressed using various methods discussed herein.

For example, with regard to configuration and management, techniques are provided to configure a parameter server within networking infrastructure elements (e.g., NICs, I/O adaptors, converged Ethernet adaptors, switches, virtual NICs, virtual switches, etc.) and expose the parameter server to various upper layers of a DL computing platform. In addition, the inter-node and intra-node communications/interactions between worker nodes and parameter server nodes in the networking infrastructure should be seamless and efficient. In addition, the selection of communication protocols to optimize data transfer and minimize latency is an important factor to consider for achieving high communication performance. Indeed, the faster the DL training operation executes, the higher demand there is on communication bandwidth. In this regard, embodiments of the invention leverage various communication protocols such as DMA, RDMA, XDP, etc., to minimize latency in parameter synchronization operations. In addition, techniques for implementing a parameter server system within a networking infrastructure are designed to provide a flexible and scalable worker node deployment configuration which can accommodate a bare metal or a virtualization (e.g., container, virtual machine, etc.) environment for worker nodes.

In this regard, embodiments of the invention provide techniques to implement a "PS-in-networking" system in which a parameter server system is incorporated within a networking infrastructure of computing system. A parameter server can be implemented in a smart NIC, a virtual NIC, a computational switch, a virtual switch, etc. In addition to enhancing synchronization communication and reducing latency, a PS-in-networking system provides various advantages. For example, a PS-in-networking system provides good scalability wherein each worker node can have a smart NIC that executes a parameter server node, allowing parameter synchronization to scale as more worker nodes are added. In addition, by offloading the parameter server logic from a host CPU or accelerator device (e.g., GPU), the CPU can focus on executing functions such as data pre-processing and pipeline management, and the GPU devices can focus on executing DL training operations.

Furthermore, current state-of-the-art smart NIC devices by design are network optimized and perform various functions such as TCP offloading (via a TCP offload engine (TOE)), real-time data compression/encryption, and other hardware accelerator functions. As such, smart NIC devices can readily perform the computation functions (e.g., averaging gradient parameters) of a parameter server without impacting the other tasks that may be concurrently performed by the NIC device. Further, a PS-in-networking system can be configured to leverage virtualization functionalities, such as single root input/output virtualization (SR-IOV), etc., in a virtualized environment. As is known in the art, SR-IOV is a specification that allows a single physical PCIe resource to be shared in a virtual environment. In this manner, worker nodes can run in a virtualization environment (e.g., container, or virtual machine), which allows a smart NIC to utilize the SR-IOV protocol to enhance communications between parameter server nodes and worker nodes.

Figure 2:
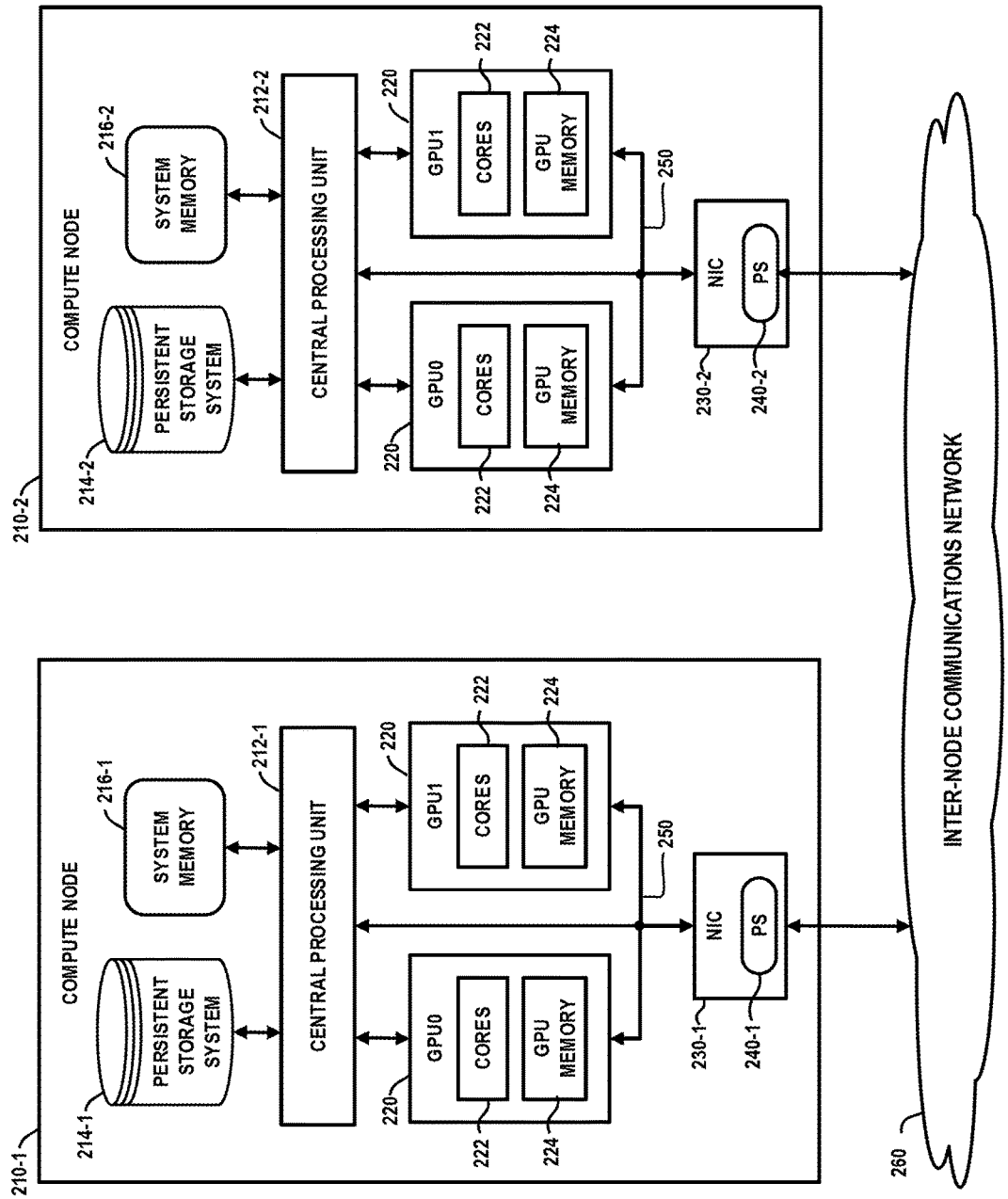
FIG. 2 schematically illustrates a distributed computing system which comprises a distributed parameter server system that is incorporated within a networking infrastructure of the distributed computing system, according to an embodiment of the invention.

FIG. 2 schematically illustrates a distributed computing system which comprises a distributed parameter server system that is incorporated within a networking infrastructure of the distributed computing system, according to an embodiment of the invention. In particular, FIG. 2 schematically illustrates a distributed HPC system 200 comprising a plurality of compute nodes 210-1 and 210-2 that are network connected over an inter-node communications network 260 (e.g., TCP/IP, GbE, 10/25/40/100 GbE), RDMA, IB, etc.). In some embodiments, the compute nodes 210-1 and 210-2 are separate physical machines (e.g., server nodes). The compute nodes 210-1 and 210-2 comprise respective CPU devices 212-1 and 212-2, persistent storage systems 214-1 and 214-2 (e.g., hard disk drive (HDD devices), and system memory 216-1 and 216-2 (e.g., dynamic random-access memory (DRAM)).

In addition, each compute node 210-1 and 210-2 comprises a plurality of GPU devices 220 (e.g., GPU0 and GPU1) and respective network interface cards (NICs) 230-1 and 230-2. The GPU devices 220 comprise GPU cores 222 and GPU memory 224. The NICs 230-1 and 230-2 execute respective parameter server (PS) nodes 240-1 and 240-2. Each compute node 210-1 and 210-2 comprises an intra-node connection topology 250 to connect the CPU devices 212-1 and 212-2 to the respective GPU devices 220, and to connect the CPU devices 212-1 and 212-2 and GPU devices 220 to the respective NIC devices 230-1 and 230-2. The intra-node connection topology 250 within the compute nodes 210-1 and 210-2 can be implemented using various communication protocols such as a DMA, IB, PCIe, NVLink, GPUDirect, and other point-to-point serial interconnect protocols that enable, e.g., CPU-GPU communication, GPU-GPU communication, GPU-NIC communication, and CPU-NIC communication.

The distributed HPC system 200 is configured to perform a distributed SGD training process to train DL models using a data-parallel training process executed on the distributed computing system 200, which is the same or similar to the DL training process discussed above for FIG. 1. For example, the CPU devices 212-1 and 212-2 are utilized to execute the functionalities of the deep learning computing platform 50 of FIG. 1, and the GPU devices 220 are configured as worker nodes to execute DL model training operations (forward, backward, weight update operations) using kernel functions that are loaded in the GPU memory 224 and executed by the GPU cores 222.

During a DL training process, the CPU devices 212-1 and 212-2 will access mini-batches of a training dataset from the respective persistent storage systems 214-1 and 214-2, and store the mini-batches of data in the respective system memories 216-1 and 216-2. For a given iteration of a DL training process, a mini-batch of data (M data samples) is accessed from each system memory 216-1 and 216-2 and evenly distributed among the two (2) GPU worker nodes 220 on each compute node 210-1 and 210-2 such that M/2 data samples of the given mini-batch of data are stored in the GPU memory 224 of the GPU devices 220 of each compute node 210-1 and 210-2.

Each worker node process being executed by the GPU devices 220 will execute DL model training kernel functions using the GPU cores 222 to process a local subset of a given mini-batch of training data for the given iteration to compute local model parameters (e.g., gradients). The GPU devices 220 on the compute node 210-1 will communicate with the local parameter server node 240-1 executing on the NIC device 230-1 to transfer the local processing results (e.g., computed gradients) to the local parameter server node 240-1. Similarly, the GPU devices 220 on the compute node 210-2 will communicate with the local parameter server node 240-2 executing on the NIC device 230-2 to transfer the local processing results (e.g., computed gradients) to the local parameter server node 240-2.

The local parameter server nodes 240-1 and 240-2 communicate over the inter-node network 260 to aggregate the local processing results and synchronize the global aggregated processing results with all worker nodes. In some embodiments, one of the parameter server nodes 240-1 and 240-2 is designated as a master parameter server node which is configured to receive the local processing results from all parameter server nodes, perform an all-reduce operation to aggregate the local process results to generate a global set of parameters (global reduced parameters) and then distribute the global set of parameters to each local parameter server node to copy the global parameters to the memory of the GPU device executing the worker nodes.

In the example embodiment of FIG. 2, the compute node 210-1 comprises two (or more) GPU devices 220 which utilize the same parameter server node 240-1 on the NIC device 230-1, and the compute node 210-2 comprises two (or more) GPU devices 220 which utilize the same parameter server node 240-2 on the NIC device 230-2. In this configuration, each parameter server node 240-1 and 240-2 can perform a local parameter aggregation process, wherein instead of sending the set of local gradient values of each worker process (executing on the GPU devices 220) to a remote master parameter node, the local parameters can be locally aggregated on the local parameter server node (i.e., calculate sum). The locally-aggregated result can then be transmitted to another parameter server node (e.g., master PS), thereby reducing network traffic. Once the global aggregated parameter set is computed by the master PS node, it can be broadcasted to other non-master PS nodes, which then copy the data to memory of the worker nodes (e.g., the local PS node can DMA copy the global aggregated parameter set to the local worker node).

Figure 3:
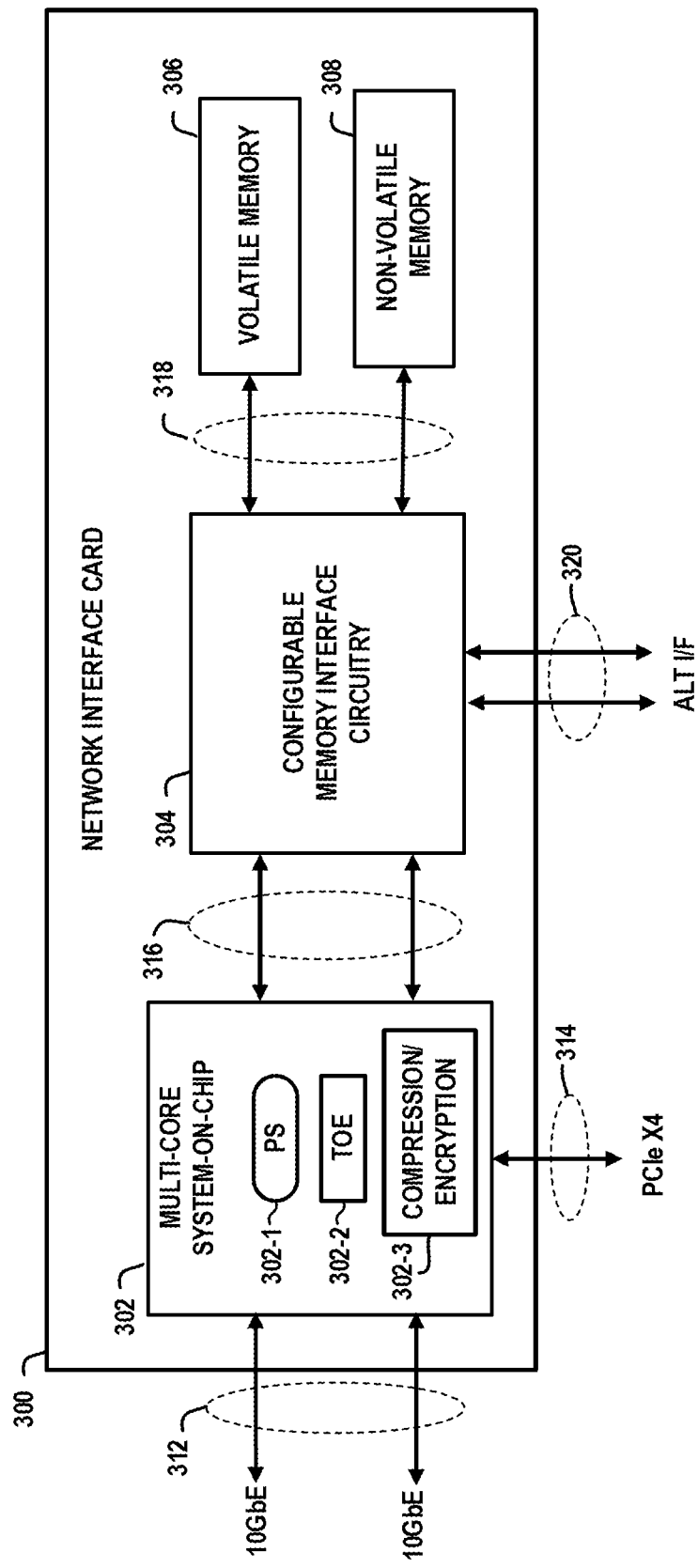
FIG. 3 schematically illustrates a network interface card which is configured to execute a parameter server node of a distributed parameter server system integrated within a networking infrastructure of a computing system, according to an embodiment of the invention.

FIG. 3 schematically illustrates a network interface card (NIC) 300 which is configured to execute a parameter server node of a distributed parameter server system that is integrated within a networking infrastructure of a computing system, according to an embodiment of the invention. The NIC 300 provides an example embodiment of the NICs 230-1 and 230-2 shown in FIG. 2. The NIC 300 comprises a multi-core system-on-chip (SoC) 302, configurable memory interface circuitry 304, and memory devices 306 and 308. The multi-core SoC 302 executes core logic to implement a parameter server node 302-1 which performs various functions as discussed herein for processing and synchronizing local and global model parameters for worker nodes executing in a distributed DL training process. The multi-core SoC 302 further comprises embedded hardware modules to implement a TCP offload engine (TOE) 302-2, a compression/encryption engine 302-3, and other hardware accelerator functions. The TOE 302-2 performs offload processing of an entire TCP/IP stack of a computing node in which the NIC 300 is installed.

The multi-core SoC 302 implements network interface circuitry to support multiple network input/output (I/O) ports 312 for inter-node network communication. The I/O network ports 312 can implement network communication protocols such as TCP/IP, GbE, 10/25/40/100 GbE), RDMA, IB, etc. In addition, multi-core SoC 302 implements network interface circuitry to support one or more I/O ports 314 for intra-node network communication (e.g., PCIe, etc.).

The multi-core SoC 302 is connected to the configurable memory interface circuitry 304 via an internal communication bus 316 (e.g., PCIe x4 communication bus). In one embodiment, the configurable memory interface circuitry 304 comprises a FPGA device which can be configured to provide a memory interface to various types of memory devices 306 and 308 located on the NIC 300. The configurable memory interface circuitry 304 is connected to the memory devices 306 and 308 using memory buses 318. The configurable memory interface circuitry 304 can be configured to provide a memory interface to various types of remote memory devices (not residing on the NIC 300), which are connected via an alternative interface communication buses 320.

The on-board memory devices 306 and 308 include volatile memory 306 and non-volatile memory 308, which are utilized to store program instructions that are read and processed by the multi-core SoC 302 to execute a native operating system and one or more logic node functions (e.g., parameter server 302-1) and to temporarily store data that is utilized and/or generated by the native OS and application programs running on multi-core SoC 302. For example, the volatile memory 306 may be a dynamic random-access memory (e.g., DRAM) or other forms of volatile random-access memory. The non-volatile memory 308 may comprise a flash storage device, a SSD (solid-state drive) device, or other types and combinations of non-volatile memory. The memory devices 306 and 308 other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

In one embodiment, the multi-core SoC 302 comprises a multi-core processor with a reduced instruction set computing (RISC) architecture. For example, the multi-core SoC 302 may be a 64-bit ARM (Advanced RISC machine) multi-core processor (e.g., ARMv8), a 64-bit MIPS (Microprocessor Without Interlocked Pipeline Stages) multi-core processor, a RISC-V multi-core processor, etc. The multi-core SoC 302 can run any suitable operating system such as a 64 bit Linux kernel. When the IP address for the NIC 300 is configured, the NIC 300 can be accessed and managed using a suitable security protocol such as SSH (Secure Shell), or other methods to securely access remote Linux systems. The core logic of the parameter server 302-1 can execute in user space, or in kernel space by leveraging a high-performance in-kernel traffic processing framework such as XDP or eBPF. The XDP protocol provides a high performance, programmable network data path in a Linux kernel by supporting bare metal packet processing at a lowest level in the software stack.

Various configuration and management protocols can be utilized to enable PS-in-networking systems according to embodiments of the invention. For example, a deep learning computing platform (e.g., DL computing platform 50, FIG. 1) can be modified to include methods to implement an initialization protocol to configure a distributed parameter server system within a networking infrastructure of a distributed computing system. In particular, as part of a PS configuration mode, a user can specify how many parameter server nodes to be deployed as part of a distributed parameter server system within the networking infrastructure of a given computing system. For example, a user can specify a default mode in which every worker node (which is used to training a DL model) implements a parameter server node within a network device/element utilized by the worker node (e.g., a parameter server node operating in a smart NIC device). A smart NIC device may have multiple IP addresses, which may or may not be the same IP address as the worker node. If a smart NIC has the same IP address as a worker node, different socket ports can be configured to distinguish the functions of the NIC and the worker node.

As is known in the art, a "socket" is a one endpoint of a two-way communication link between two programs running on a network. A socket is bound to a port number so that the TCP layer can identify the application to which data should be sent. An endpoint (or socket) is defined by a combination of an IP address and a port number. The following configuration file illustrates an exemplary method for configuring different ports (port A and port B) to distinguish functions between worker nodes and a parameter server node executing in a network element, using an XML or JSON-like configuration file:

```
Cluster {
    worker1: {
        ip1: portA;
        ps1: { ip1: portB;} // SmartNIC for PS could have different port
    }
    worker2: {
        ip2: portA;
        ps2: {ip2:portB; ip3:portB;} // ps may have multiple IP ports
    }
    worker3: {
```

-continued

```
        ip3: portA;
    }
    ps3 {
        ip4: portB;
    } // PS could be dedicated (no worker)
    ...
}
```

The initialization stage is configured to define a number (P) of parameter server nodes to implement for the distributed parameter server system. As noted above, for balanced communication, the global parameters maintained by a parameter server can be partitioned among multiple parameter server nodes in a distributed manner, which serves to reduce memory usage of each parameter server node, and to reduce the communication traffic to/from the parameter server nodes. For example, assume that the total size of a parameter set of a given DL model is N bytes, and that there are P parameter servers, ideally, each parameter server node will manage N/P bytes of the total size of the parameter set.

In addition, as part of the initialization stage, at least one parameter server node can be designed as "master" parameter server node that is responsible for performing various functions such as (i) collecting (all gather operation) all sets of local parameters (e.g., gradients) computed by all worker nodes for a given mini-batch of training data in a given iteration of a SGD training process, (ii) aggregate the sets of local parameters by, e.g., computing average values among the local gradients computed by the worker nodes and (iii) send the aggregated parameter set (averaged values) to all workers nodes through a broadcast communication. Furthermore, among all worker/parameter server nodes, at least one worker node can be designated as a master worker node which is responsible for model initialization, mini-batch synchronization (notifying all parameter servers), and saving the final result of an intermediate DL model.

After the initialization stage is complete, and the parameter server nodes of the distributed parameter server are configured within the networking infrastructure of the computing system, each network element (e.g., smart NIC) that executes a parameter server node during real-time operation (running stage) will start a daemon thread on a specified port for the PS service, allocate memory for the global parameters assigned for handing by the PS service, and initialize the values (may be zero or randomized). The daemon thread generates control messages to perform and/or trigger functions such as, e.g., result dumping, forcing shutdown, providing notification events for mini-batch processing completion, etc. Once a training process is deemed to be complete (based on some pre-defined criterion such as meeting a maximum number of epochs/iterations of the DI, model training resulting in a DL model having a classification accuracy that meets a specified classification accuracy threshold), the parameters of the DL model can be saved by the master worker/parameter server nodes.

Figure 4:
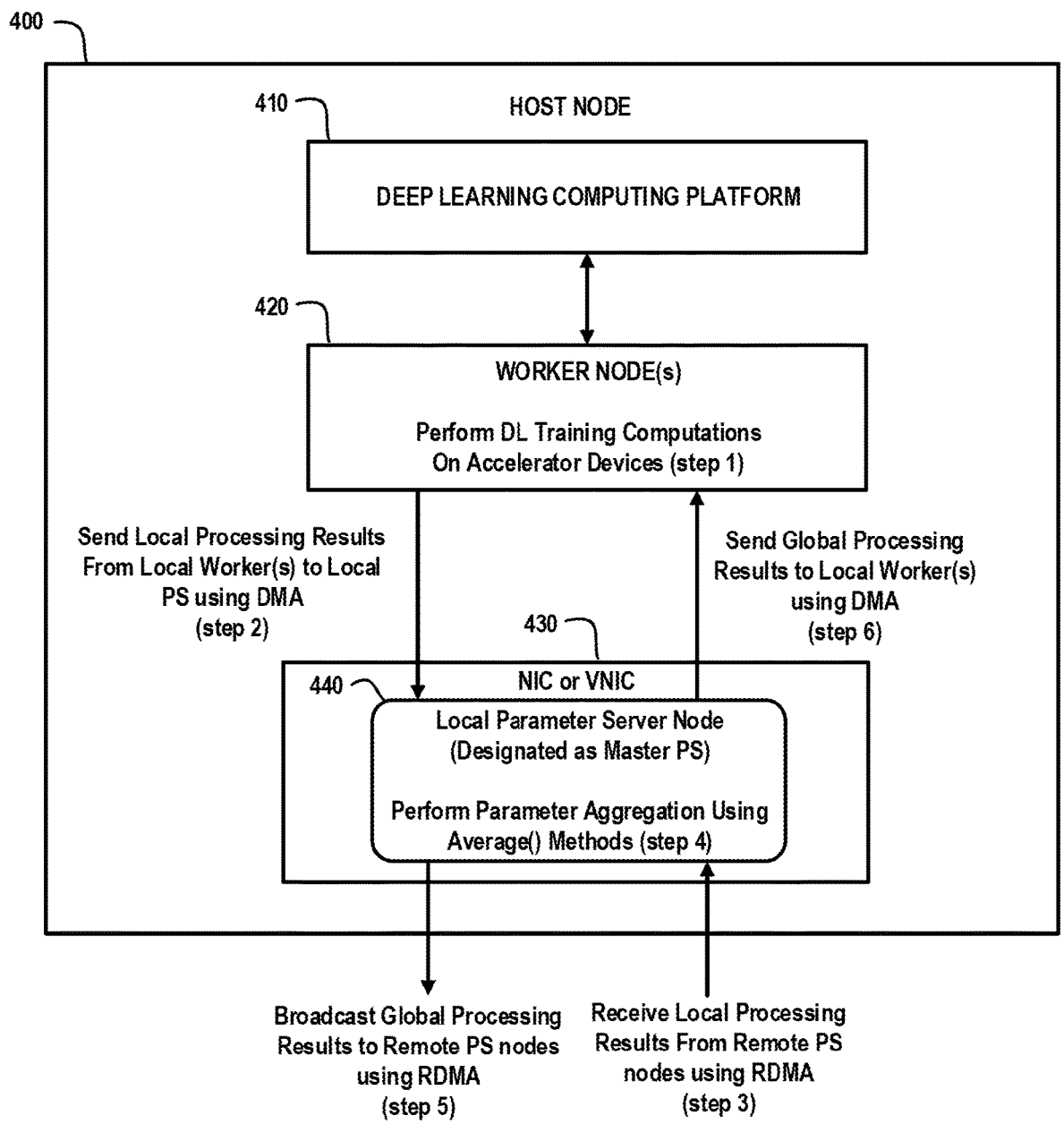
FIG. 4 schematically illustrates a method for processing and transferring data between worker and parameter server nodes in a distributed computing system in which the parameter server nodes are incorporated within a networking infrastructure of the distributed computing system, according to an embodiment of the invention.

FIG. 4 schematically illustrates a method for processing and transferring data between worker and parameter server nodes in a distributed computing system in which the parameter server nodes are incorporated within a networking infrastructure of the distributed computing system, according to an embodiment of the invention. In particular, FIG. 4 schematically illustrates a host compute node 400 (e.g., server node) comprising a deep learning computing platform 410, one or more worker nodes 420, and a networking element 430 which executes a local parameter server node 440. In one embodiment, the deep learning computing platform 410 implements the same or similar software layers and functions as the deep learning computing platform 50 discussed above in FIG. 1. The worker node(s) 420 comprise bare metal processes or virtualized processes that are executed on processor devices such as CPU devices or GPU devices on the host node 400. The networking element 430 may comprise a NIC device (e.g., NIC 300, FIG. 3) or a virtual NIC (VNIC).

FIG. 4 illustrates a data processing and communication process flow for a PS configuration in which the local parameter server node 440 is designated to be a master parameter server node (master PS) which performs an "all-reduce" operation on all local processing results (e.g., local gradient parameters) of worker nodes in a distributed computing environment. The local processing results are provided by other (remote) parameter server nodes (not shown) of the distributed parameter server system integrated in the networking infrastructure of the distributed computing environment. As an initial step, the worker node(s) 420 perform DL model training computations on respective processor devices (e.g., CPU or GPU or other accelerator devices) residing on the host node 400 (step 1). Each worker node 420 sends its local processing results to the local parameter server node 440 executing in the network element 430 (step 2). In one embodiment, a DMA process is utilized to directly transfer (device-to-device memory copy operation) the local processing results stored in the memory of the processor device(s) executing the worker node(s) 420 to a region in memory of the network element 430 which is assigned to store the parameters managed by the local parameter server node 440. The use of DMA in this instance reduces latency associated with the memory copy operation and reduces host CPU resource usage.

Furthermore, the local parameter server node 440 (acting as the master PS) receives the local processing results of all other worker nodes operating on remote host nodes, wherein such local processing results are transmitted from remote parameter server nodes operating in network elements on the remote host nodes (step 3). In one embodiment, a RDMA process is utilized to directly transfer (device-to-device memory copy operation) the local processing results of remote worker nodes from the memories of remote network elements (e.g., NIC devices) executing the remote parameter server nodes, to the target region in memory of the network element 430 which is assigned to store the parameters managed by the local parameter server node 440.

Next, the local parameter server node 440 operating as the master PS performs a parameter aggregation process using an average( ) method to compute average of all the local processing results received from the local worker nodes 420 and remote worker nodes executing on remote host nodes (step 4). If a remote host node comprises multiple worker nodes that compute local processing results, the local parameter server node executing in the network element of the remote host node will not separately send the local processing results to the master PS 440. Instead, the local parameter server node of the remote host node will perform a local aggregation process by computing an average of the local processing results of the multiple worker nodes operating on the remote host node, and then transmit the local-aggregated result to the master PS 440. The local aggregation of local processing results of multiple worker nodes in a host node serves to reduce the network traffic and communication bandwidth needed to transmit the local processing results of all worker nodes to the master PS 440 for the all-reduce operation.

Once the global aggregated processing results are computed by the master PS 440, the global aggregated processing results are broadcast (via, e.g., RDMA) to all other remote parameter server nodes of the distributed parameter server system integrated within the networking infrastructure of the distributed computing system (step 5), wherein the global aggregated processing results can then be transferred to the worker nodes executing on remote host nodes. In addition, the master PS 440 will transmit the global aggregated processing results (via, e.g., DMA) from the memory of the network element 430 to the memory of the processor devices which execute the local worker node(s) 430 (step 6).

In another embodiment, data compression methods can be utilized to compress the local processing results (e.g. after local aggregation) which are transmitted to the master PS using, for example, embedded data compression/decompression engines (e.g., compression engine 320-3, FIG. 3) of the smart NIC devices that execute the parameter server nodes. Compressing the local processing results reduces the communication bandwidth for transmitting the local processing results to the master PS. The compressed data that is received by the master PS can be decompressed prior to performing the all-reduce computations. In other embodiments, a dedicated DL-optimized compression/decompression hardware accelerator can be utilized to perform such data compression and decompression functions.

Figure 5:
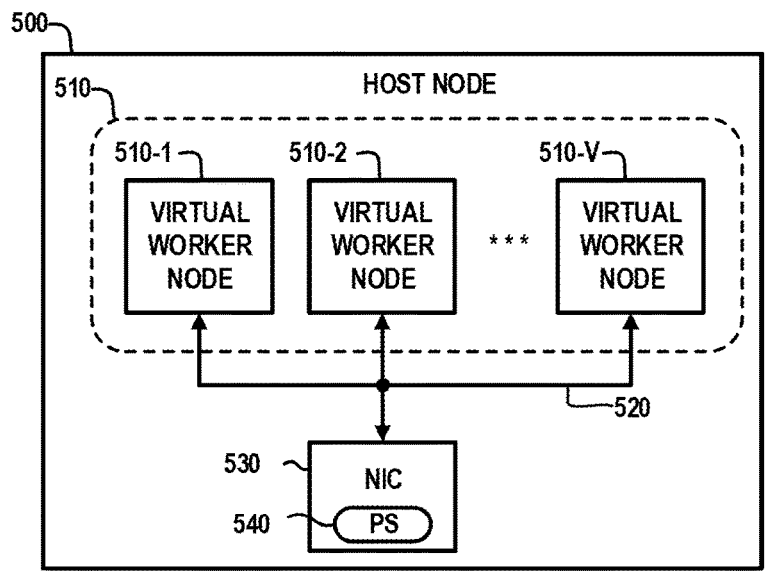
FIG. 5 schematically illustrates a distributed computing system which comprises a parameter server system that is incorporated within a networking infrastructure of the distributed computing system, according to another embodiment of the invention.

While FIG. 2 illustrates an exemplary embodiment of PS-in-networking for a distributed system comprising multiple physical compute nodes that are network connected using smart NIC devices which execute local parameter server nodes of a distributed parameter server system, other deployment configurations for PS-in-networking can be implemented depending on the application and the given computing environment. For example, FIG. 5 schematically illustrates a distributed computing system which comprises a parameter server system that is incorporated within a networking infrastructure of the distributed computing system, according to another embodiment of the invention. In particular, FIG. 5 schematically illustrates a host compute node 500 which comprises a compute cluster 510 comprising a plurality (V) of virtual worker nodes 510-1, 510-2, . . . , 510-V, which can be configured to perform a data parallel SGD training process using methods as discussed herein. The host compute node 500 further comprises an intra-node communication bus 520 (e.g., PCIe bus) and a smart NIC device 530 (or virtual NIC) which executes a parameter server 540.

In the example embodiment of FIG. 5, the virtual worker nodes 510-1, 510-2, . . . , 510-V can be container applications and/or virtual machines that execute in processor devices such as a CPU or GPU device. The virtual worker nodes 510-1, 510-2, . . . , 510-V can communicate with each other via the shared smart NIC device 530. In addition, SR-IOV can be utilized in the virtual environment to allow the virtual worker nodes 510 to share the hardware interface of the intra-node communication bus 520 (e.g., PCIe bus). The parameter server 540 can be shared by all of the virtual worker nodes 510. In another embodiment, the parameter server 540 can be logically partitioned into a plurality of parameter server nodes.

In one embodiment, the virtual worker nodes 510-1, 510-2, . . . , 510-V comprise virtual machines that are implemented using a hypervisor platform which executes on the host node 500, wherein the virtual machines are instantiated to implement the functions of the multiple virtual worker nodes. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the host node 500, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtual worker nodes 510-1, 510-2, . . . , 510-V comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute data parallel training functions on the host node 500. In yet another embodiment, containers may be used in combination with other virtualization infrastructure such as virtual machines implemented using a hypervisor, wherein Docker containers or other types of LXCs are configured to run on virtual machines in a multi-tenant environment.

Figure 6:
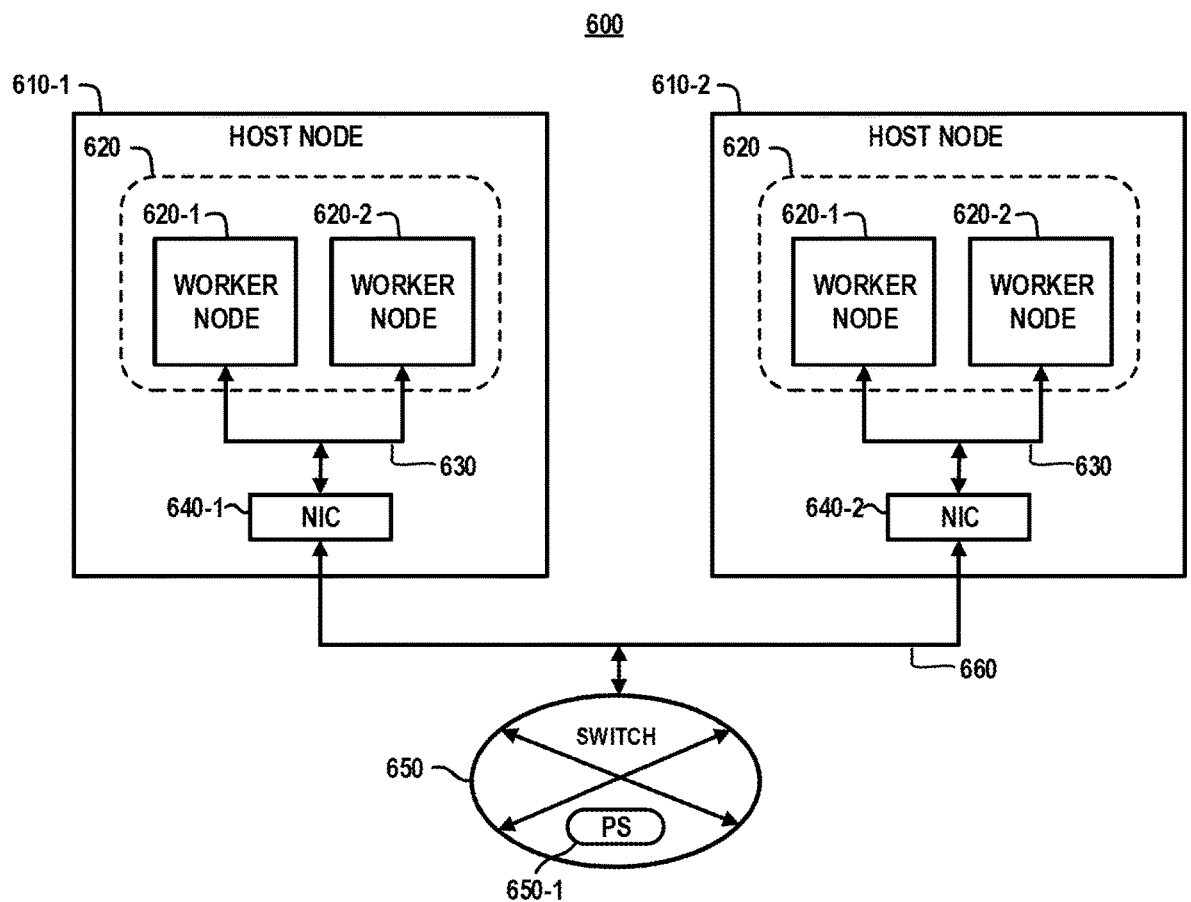
FIG. 6 schematically illustrates a distributed computing system which comprises a parameter server system that is incorporated within a networking infrastructure of the dis-

FIG. 6 schematically illustrates a distributed computing system which comprises a parameter server system that is incorporated within a networking infrastructure of the distributed computing system, according to yet another embodiment of the invention. In particular, FIG. 6 schematically illustrates a distributed computing system 600 comprising a plurality of host compute nodes 610-1 and 610-2 that are network connected over an inter-node communications network 660 (e.g., TCP/IP, GbE, 10/25/40/100 GbE, RDMA, IB, etc.). In some embodiments, the compute nodes 610-1 and 610-2 are separate physical machines (e.g., server nodes).

The compute nodes 610-1 and 610-2 comprise compute clusters 620, wherein each compute cluster 620 comprises a plurality of worker nodes 620-1 and 620-2 which execute on processor devices (e.g., CPUs, GPUs, etc.). The cluster of worker nodes 620-1 and 620-2 in each compute node 610-1 and 610-2 is connected to a respective NIC device 640-1 and 640-2 using an intra-node communication bus 630.

In the example embodiment, a network switch 650 connected to, and part of the inter-node communication network 660 executes a parameter server 650-1. In one embodiment, the network switch 650 comprises a computational (smart) switch that is coupled to the respective NIC devices 640-1 and 640-2 to network connect the compute nodes 610-1 and 610-2. The computational switch 650 implements standard switching functions, as well as data computation processing and networking functions using high performance processor devices (e.g., SoC, CPU, CPU and GPU, etc.) with either multiple 100G or one 200G (or 400G, in the future) connectivity, connected directly to switch ASICs. The close proximity of the compute nodes 610-1 and 610-2 to the computational switch 650, coupled with the high processing power and high I/O port bandwidth of the NIC devices 640-1 and 640-2 and the switch 650, readily enables a PS-in-networking configuration in which the computational switch 650 can host a parameter server node (e.g., master PS node), while significantly reducing network bandwidth communication and latency associated with the synchronization functions performed by the parameter server 650-1.

In summary, PS-in-networking techniques as disclosed herein can be readily leveraged in state-of-the-art networking hardware used in data center configurations, to provide increased communication efficiency (e.g., latency and bandwidth) as compared to conventional systems in which parameter servers are executed in CPU or GPU devices. In addition, PS-in-networking systems according to embodiments of the invention provide good scalability, allow offloading of parameter server functions from CPU and GPU devices, and provide flexible configurations to support bare metal and virtualization environments.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   executing a distributed deep learning (DL) model training process to train a DL model using a plurality of server nodes comprising at least a first server node and a second server node, wherein the first server node comprises a first processor, a first set of accelerator devices, and a first network interface component, wherein the second server node comprises a second processor, a second set of accelerator devices, and a second network interface component, wherein executing the DL model training process comprises performing an iterative process, wherein at least one iteration of the DL model training process comprises:
      distributing, by the first and second processors, a batch of training data to the respective first and second set of accelerator devices, wherein the accelerator devices of the first and second set of accelerator devices each receive a respective portion of the batch of training data;
      executing a first set of worker processes on the first set of accelerator devices, and a second set of worker processes on the second set of accelerator devices, wherein the worker processes of the first and second set of worker processes compute respective local parameters using the respective portions of the batch of training data;

performing, by the worker processes of the first set of worker processes, respective direct memory copy operations to copy the respective local parameters to a first memory associated with the first network interface component;

performing, by the worker processes of the second set of worker processes, respective direct memory copy operations to copy the respective local parameters to a second memory associated with the second network interface component;

aggregating, by a first parameter server process executing on the first network interface component, the local parameters provided by the first set of worker processes to thereby generate a first set of local aggregated parameters, wherein the first parameter server process comprises a master parameter server process;

aggregating, by a second parameter server process executing on the second network interface component, the local parameters provided by the second set of worker processes to thereby generate a second set of local aggregated parameters;

performing, by the second parameter server process, a direct memory copy operation to copy the second set of local aggregated parameters to the first memory associated with the first network interface component;

aggregating, by the first parameter server process, at least the first and second set of local aggregated parameters to thereby generate a global set of parameters; and performing, by the first parameter server process, a direct memory copy operation to copy the global set of parameters to the first memory associated with the first network interface component.

2. The method of claim 1, wherein the first and second set of worker processes are managed by respective virtual worker nodes.

3. The method of claim 1, wherein the first and second set of accelerator devices comprise graphics processing unit devices.

4. The method of claim 1, wherein the first and second network interface components comprise respective first and second network interface cards of the respective first and second server nodes.

5. The method of claim 4, wherein the first and second network interface cards comprise virtual network interface cards.

6. The method of claim 4, wherein the first and second network interface cards comprise respective first and second physical network interface cards.

7. The method of claim 1, wherein the direct memory copy operations, which are performed by the worker processes of the first and second set of worker processes to copy the respective local parameters to the respective first and second memories associated with the respective first and second network interface components, are implemented using a direct memory access (DMA) protocol.

8. The method of claim 1, wherein the direct memory copy operations, which are performed by the first and second parameter server processes, are implemented using a remote direct memory access (RDMA) protocol.

9. An article of manufacture comprising a processor-readable storage medium having stored program code of one or more software programs, wherein the program code is executable by one or more processors to implement method steps comprising:

executing a distributed deep learning (DL) model training process to train a DL model using a plurality of server nodes comprising at least a first server node and a second server node, wherein the first server node comprises a first processor, a first set of accelerator devices, and a first network interface component, wherein the second server node comprises a second processor, a second set of accelerator devices, and a second network interface component, wherein executing the DL model training process comprises performing an iterative process, wherein at least one iteration of the DL model training process comprises:

distributing, by the first and second processors, a batch of training data to the respective first and second set of accelerator devices, wherein the accelerator devices of the first and second set of accelerator devices each receive a respective portion of the batch of training data;

executing a first set of worker processes on the first set of accelerator devices, and a second set of worker processes on the second set of accelerator devices, wherein the worker processes of the first and second set of worker processes compute respective local parameters using the respective portions of the batch of training data;

performing, by the worker processes of the first set of worker processes, respective direct memory copy operations to copy the respective local parameters to a first memory associated with the first network interface component;

performing, by the worker processes of the second set of worker processes, respective direct memory copy operations to copy the respective local parameters to a second memory associated with the second network interface component;

aggregating, by a first parameter server process executing on the first network interface component, the local parameters provided by the first set of worker processes to thereby generate a first set of local aggregated parameters, wherein the first parameter server process comprises a master parameter server process;

aggregating, by a second parameter server process executing on the second network interface component, the local parameters provided by the second set of worker processes to thereby generate a second set of local aggregated parameters;

performing, by the second parameter server process, a direct memory copy operation to copy the second set of local aggregated parameters to the first memory associated with the first network interface component;

aggregating, by the first parameter server process, at least the first and second set of local aggregated parameters to thereby generate a global set of parameters; and performing, by the first parameter server process, a direct memory copy operation to copy the global set of parameters to the first memory associated with the first network interface component.

10. The article of manufacture of claim 9, wherein the first and second set of worker processes are managed by respective virtual worker nodes.

11. The article of manufacture of claim 9, wherein the first and second set of accelerator devices comprise graphics processing unit devices.

12. The article of manufacture of claim 9, wherein the first and second network interface components comprise respective first and second network interface cards of the respective first and second server nodes.

13. The article of manufacture of claim 9, wherein:
the direct memory copy operations, which are performed by the worker processes of the first and second set of worker processes to copy the respective local parameters to the respective first and second memories associated with the respective first and second network interface components, are implemented using a direct memory access (DMA) protocol; and
the direct memory copy operations, which are performed by the first and second parameter server processes, are implemented using a remote direct memory access (RDMA) protocol.

14. A computing system, comprising:
a server cluster comprising a plurality of server nodes comprising at least a first server node and a second server node, wherein the first server node comprises a first processor, a first set of accelerator devices, and a first network interface component, wherein the second server node comprises a second processor, a second set of accelerator devices, and a second network interface component, wherein the plurality of server nodes are configured to perform a distributed deep learning (DL) model training process to train of a DL model, wherein the DL model training process comprises an iterative process, wherein in performing at least one iteration of the DL model training process:
the first and second processors are configured to distribute a batch of training data to the respective first and second set of accelerator devices, wherein the accelerator devices of the first and second set of accelerator devices each receive a respective portion of the batch of training data;
the first set of accelerator devices is configured to execute a first set of worker processes, and the second set of accelerator devices is configured to execute a second set of worker processes, wherein the worker processes of the first and second set of worker processes compute respective local parameters using the respective portions of the batch of training data;
the worker processes of the first set of worker processes are configured to perform respective direct memory copy operations to copy the respective local parameters to a first memory associated with the first network interface component;
the worker processes of the second set of worker processes are configured to perform respective direct memory copy operations to copy the respective local parameters to a second memory associated with the second network interface component;
the first network interface component is configured to execute a first parameter server process which aggregates the local parameters provided by the first set of worker processes to thereby generate a first set of local aggregated parameters, wherein the first parameter server process comprises a master parameter server process;
the second network interface component is configured to execute a second parameter server process, wherein the second parameter server process is configured to (i) aggregate the local parameters provided by the second set of worker processes to thereby generate a second set of local aggregated parameters, and (ii) perform a direct memory copy operation to copy the second set of local aggregated parameters to the first memory associated with the first network interface component; and
the first parameter server process executing on the first network interface component is configured to (i) aggregate at least the first and second set of local aggregated parameters to thereby generate a global set of parameters, and (ii) perform a direct memory copy operation to copy the global set of parameters to the first memory associated with the first network interface component.

15. The computing system of claim 14, wherein the first and second set of worker processes are managed by respective virtual worker nodes.

16. The computing system of claim 14, wherein the first and second set of accelerator devices comprise graphics processing unit devices.

17. The computing system of claim 14, wherein:
the direct memory copy operations, which are performed by the worker processes of the first and second set of worker processes to copy the respective local parameters to the respective first and second memories associated with the respective first and second network interface components, are implemented using a direct memory access (DMA) protocol; and
the direct memory copy operations, which are performed by the first and second parameter server processes, are implemented using a remote direct memory access (RDMA) protocol.

18. The computing system of claim 14, wherein the first and second network interface components comprise respective first and second network interface cards of the respective first and second server nodes.

19. The computing system of claim 18, wherein the respective first and second network interface cards comprise respective first and second physical network interface cards, wherein at least the first physical network interface card comprises:
a system-on-chip configured to execute the first parameter server process;
a configurable memory interface circuit; and
a plurality of memory devices comprising volatile memory, and non-volatile memory;
wherein the configurable memory interface circuit is configured to enable components of the system-on-chip to access the plurality of memory devices.

20. The computing system of claim 19, wherein the system-on-chip is configured to execute (i) a data compression engine, and (ii) a transfer control protocol (TCP) offload engine, wherein the TCP offload engine is configured to offload an entire TCP/IP protocol stack of the first server node.

* * * * *